United States Patent
Wu et al.

(10) Patent No.: US 11,570,724 B2
(45) Date of Patent: Jan. 31, 2023

(54) METHOD FOR PH CALCULATION AND TERMINAL

(71) Applicant: VIVO MOBILE COMMUNICATION CO., LTD., Guangdong (CN)

(72) Inventors: Yumin Wu, Chang'an Dongguan (CN); Xiaodong Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 44 days.

(21) Appl. No.: 17/114,342

(22) Filed: Dec. 7, 2020

(65) Prior Publication Data

US 2021/0092692 A1 Mar. 25, 2021

Related U.S. Application Data

(63) Continuation of application No. PCT/CN2019/089255, filed on May 30, 2019.

(30) Foreign Application Priority Data

Jun. 19, 2018 (CN) .......................... 201810631168.0

(51) Int. Cl.
H04W 52/36 (2009.01)
H04W 52/24 (2009.01)

(52) U.S. Cl.
CPC ....... *H04W 52/365* (2013.01); *H04W 52/242* (2013.01)

(58) Field of Classification Search
CPC .......................... H04W 52/242; H04W 52/365
See application file for complete search history.

(56) References Cited

U.S. PATENT DOCUMENTS

2012/0040707 A1 2/2012 Kim et al.
2017/0019866 A1 1/2017 Malkamaki et al.

FOREIGN PATENT DOCUMENTS

| CN | 103781111 A | 5/2014 |
| CN | 105766034 A | 7/2016 |
| CN | 106134264 A | 11/2016 |

OTHER PUBLICATIONS

CN Office Action in Application No. 201810631168.0 dated May 18, 2020.
"Impact of pathloss reference on PHR triggering" ASUSTeK, 3GPP TSG-RAN WG2 Meeting #102, R2-1806917, May 21, 2018.
"PHR Trigger upon Beam Change", CATT, 3GPP TSG-RAN WG2 Meeting #102, R2-1807017, May 21, 2018.
"Discussion on PHR for beam", vivo, 3GPP TSG-RAN WG2 Meeting #102, R2-1807583, May 21, 2018.
KR Office Action in Application No. 10-2021-70000308 dated Jan. 18, 2022.
"3rd Generation Partnership Project; Technical Specification Group Radio Access Network; NR; Medium Access Control (MAC) protocol specification (Release 15)" 3GPP TS 38.321 V15.1.0 (Mar. 2018).

*Primary Examiner* — James P Duffy
(74) *Attorney, Agent, or Firm* — Maschoff Brennan

(57) ABSTRACT

A method for PH calculation and a terminal are provided. The method includes: receiving a path loss reference change indication; and calculating a PH by using a specific path loss reference, where the specific path loss reference includes a path loss reference before receiving the path loss reference change indication, or a changed path loss reference indicated by the path loss reference change indication.

9 Claims, 3 Drawing Sheets

US 11,570,724 B2

METHOD FOR PH CALCULATION AND TERMINAL

CROSS-REFERENCE TO RELATED APPLICATIONS

This application is continuation application of PCT International Application No. PCT/CN2019/089255 filed on May 30, 2019, which claims priority to Chinese Patent Application No. 201810631168.0, filed in China on Jun. 19, 2018, the disclosures of which are incorporated in their entireties by reference herein.

TECHNICAL FIELD

This disclosure relates to the field of communications technologies, and in particular, to a method for power headroom (Power Headroom, PH) calculation and a terminal.

BACKGROUND

In a communications system, a terminal needs to report a power headroom report (Power Headroom Report, PHR). The PHR includes a PH, which may also be referred to as a cell power headroom. Certainly, the PHR may further include a maximum transmission power for a cell (Pcmax.c). The PH is calculated from values or the like measured by a terminal based on a path loss reference (Path loss reference). However, the path loss reference in current communications systems is pre-configured for the terminal. In other words, the path loss reference obtained by the terminal is always unchanged, which results in poor performance of PH reporting.

SUMMARY

Embodiments of this disclosure provide a method for PH calculation and a terminal, to resolve a problem of relatively poor performance of PH reporting by a terminal.

According to a first aspect, an embodiment of this disclosure provides a method for PH calculation, applied to a terminal, where the method includes:
  receiving a path loss reference change indication; and
  calculating a PH by using a specific path loss reference, where the specific path loss reference includes a path loss reference before receiving the path loss reference change indication, or a changed path loss reference indicated by the path loss reference change indication.

According to a second aspect, an embodiment of this disclosure provides a terminal, including:
  a receiving module, configured to receive a path loss reference change indication; and
  a calculation module, configured to calculate a PH by using a specific path loss reference, where the specific path loss reference includes a path loss reference before receiving the path loss reference change indication, or a changed path loss reference indicated by the path loss reference change indication.

According to a third aspect, an embodiment of this disclosure provides a terminal, including a memory, a processor, and a computer program stored in the memory and capable of running on the processor, where when the computer program is executed by the processor, the steps of the method for PH calculation provided in the embodiments of this disclosure are implemented.

According to a fourth aspect, an embodiment of this disclosure provides a computer-readable storage medium, where the computer-readable storage medium stores a computer program, and when the computer program is executed by a processor, the steps of the method for PH calculation provided in the embodiments of this disclosure are implemented.

In the embodiments of this disclosure, a path loss reference change indication is received; and a PH is calculated by using a specific path loss reference, where the specific path loss reference includes a path loss reference before receiving the path loss reference change indication, or a changed path loss reference indicated by the path loss reference change indication. This can improve performance of PH reporting by the terminal.

BRIEF DESCRIPTION OF DRAWINGS

To describe the technical solutions in the embodiments of this disclosure more clearly, the following briefly describes the accompanying drawings for describing the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The term "include" and any other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of this disclosure, the term such as "exemplary" or "for example" is used to represent an example, an instance, or an illustration. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The following describes the embodiments of this disclosure with reference to the accompanying drawings. A method for PH calculation and a terminal provided in the embodiments of this disclosure may be applied to a wireless communications system. The wireless communications system may be a 5G system, an evolved long term evolution (Evolved Long Term Evolution, eLTE) system, or a subsequent evolved communications system.

Figure 1:
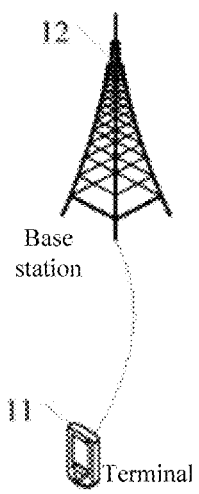
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a terminal 11 and at least one base station 12. The terminal 11 may be user equipment (User Equipment, UE) or another terminal side device, for example, a terminal side device such as a mobile phone, a tablet personal computer (Tablet Personal Computer), a laptop computer (Laptop Computer), a personal digital assistant (personal digital assistant, PDA), a mobile internet device (Mobile Internet Device, MID), or a wearable device (Wearable Device). It should be noted that a specific type of the terminal 11 is not limited in the embodiments of this disclosure. The base station 12 may be a 4G base station, a 5G base station, a base station of a later release, or a base station in another communications system, or may be referred to as a NodeB, an evolved NodeB, or another term in the art. Provided that a same technical effect is achieved, the base station is not limited to a specific technical term. In addition, the base station 12 may be a master node (Master Node, MN) or a secondary node (Secondary Node, SN). It should be noted that the 5G base station is merely used as an example in the embodiments of this disclosure, rather than limiting a specific type of the base station.

Figure 2:
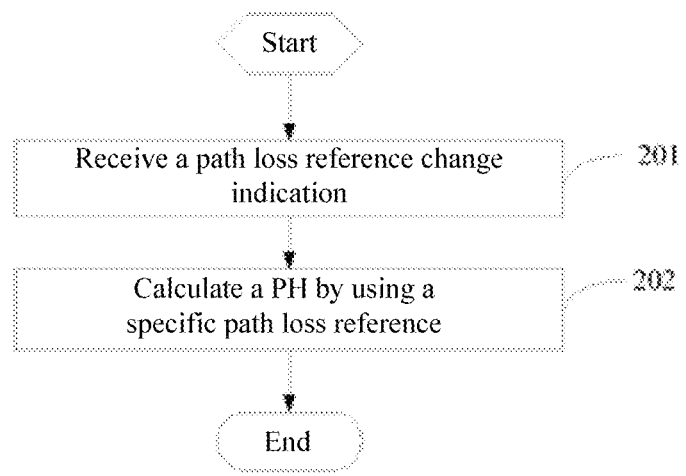
FIG. 2 is a flowchart of a method for PH calculation according to an embodiment of this disclosure.

FIG. 2 is a flowchart of a method for PH calculation according to an embodiment of this disclosure. The method is applied to a terminal, and as shown in FIG. 2, includes the following steps.

Step 201: Receive a path loss reference change indication (Change of path loss reference).

The terminal may receive the path loss reference change indication sent by a base station. Certainly, the possibility that the path loss reference change indication is sent by other devices is not excluded, for example, the path loss reference change indication is sent by another terminal.

In addition, the path loss reference change indication is used to indicate changing a first path loss reference to a second path loss reference, where the first path loss reference may be understood as a path loss reference before receiving the path loss reference change indication, and the second path loss reference may be understood as a changed path loss reference indicated by the path loss reference change indication.

It should be noted that the first path loss reference herein may be one or more path loss references. Likewise, the second path loss reference may also be one or more path loss references. For example, the first path loss reference may include one or more of a path loss reference corresponding to a synchronization signal block (Synchronous Signal Block, SSB) 1, a path loss reference corresponding to an SSB 2, a path loss reference for a physical uplink shared channel (Physical Uplink Shared Channel, PUSCH), a path loss reference for a physical uplink control channel (Physical Uplink Control Channel, PUCCH), a path loss reference for a sounding reference signal (Sounding Reference Signal, SRS), and the like. Then the path loss reference change indication may be used to change these path loss references to other path loss references.

In addition, the path loss reference change indication may be indicated by using a medium access control control element (Medium Access Control Control Element, MAC CE) or a physical downlink control channel (Physical Downlink Control Channel, PDCCH) or the like, so as to indicate a change of a path loss reference currently used by the terminal.

Further, after receiving the path loss reference change indication, the terminal may perform the change of the path loss reference, for example, changes the first path loss reference to the second path loss reference.

Step 202: Calculate a PH by using a specific path loss reference, where the specific path loss reference includes a path loss reference before receiving the path loss reference change indication, or a changed path loss reference indicated by the path loss reference change indication.

The specific path loss reference may be determined according to a time of PH calculation, a time of triggering PHR reporting, or a time at which a protocol data unit (Protocol Data Unit, PDU) including a PHR is generated. For example, depending on different situations, a determined specific path loss reference may include the path loss reference before receiving the path loss reference change indication, or the changed path loss reference indicated by the path loss reference change indication. The PDU may be a medium access control (Medium Access Control, MAC) PDU.

In addition, the PH may include one or more of the following:
    a PH value for sending a physical uplink shared channel (Physical Uplink Shared Channel, PUSCH) by the terminal;
    a PH value for sending a PUSCH and a physical uplink control channel (Physical Uplink Control Channel, PUCCH) by the terminal; and
    a PH value for sending a sounding reference signal (Sounding Reference Signal, SRS) by the terminal.

In the foregoing steps, the path loss reference change indication is received, and therefore the path loss reference before receiving the path loss reference change indication or the changed path loss reference indicated by the path loss reference change indication may be selected for PH calculation, so as to improve performance of PH reporting by the terminal. This is because the terminal can select an appropriate path loss reference for the PH calculation according to factors such as different scenario requirements or a receiving time of the path loss reference change indication. It should be noted that, in this embodiment of this disclosure, the sequence of performing step 201 and step 202 is not limited. For example, when the receiving time of the path loss reference change indication is after generation of the PHR PDU, step 201 may be performed after step 202; or when the receiving time of the path loss reference change indication is before generation of the PHR PDU, step 201 may be performed before step 202, and this case is used as an example in the figure for description.

In the embodiments of this disclosure, a path loss reference change indication is received; and a PH is calculated by using a specific path loss reference, where the specific path loss reference includes a path loss reference before receiving the path loss reference change indication, or a changed path loss reference indicated by the path loss reference change indication. This can improve performance of PH reporting by the terminal.

Figure 3:
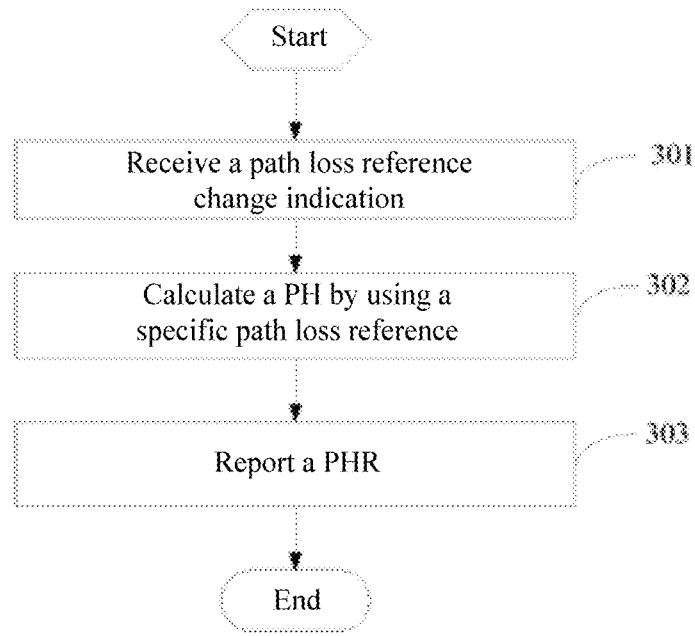
FIG. 3 is a flowchart of another method for PH calculation according to an embodiment of this disclosure.

FIG. 3 is a flowchart of a method for PH calculation according to another embodiment of this disclosure. The method is applied to a terminal, and as shown in FIG. 3, includes the following steps.

Step 301: Receive a path loss reference change indication.

Step 302: Calculate a PH by using a specific path loss reference, where the specific path loss reference includes a path loss reference before receiving the path loss reference change indication, or a changed path loss reference indicated by the path loss reference change indication.

In an optional implementation, the specific path loss reference includes:

a latest used path loss reference.

The latest used path loss reference may be a path loss reference used by the terminal the last time. For example, when the path loss reference change indication is not received, the latest used path loss reference is the path loss reference before receiving the path loss reference change indication; or if the path loss reference change indication is received, the latest used path loss reference is the changed path loss reference indicated by the path loss reference change indication. This is because after the terminal receives the path loss reference change indication, the terminal may change the path loss reference.

By using the latest used path loss reference for the PH calculation, it can be ensured that a PH in a PHR reported by the terminal to a base station keeps consistent with a path loss reference used by the base station to calculate the PH, so as to improve reporting accuracy.

In an optional implementation, if a receiving time of the path loss reference change indication is before a second time, the latest used path loss reference includes: the changed path loss reference indicated by the path loss reference change indication; or if the receiving time of the path loss reference change indication is after the second time, or the receiving time of the path loss reference change indication overlaps with the second time, the latest used path loss reference includes: the changed path loss reference indicated by the path loss reference change indication, wherein the terminal changes a PH value in the PHR to a PH calculated by using the changed path loss reference.

The second time is a time at which the terminal generates a PDU including the PHR or a specific time before a reporting moment of the power headroom report PHR. That the receiving time of the path loss reference change indication overlaps with the second time may mean that the path loss reference change indication is received while the PDU including the PHR is generated.

In this implementation, if the receiving time of the path loss reference change indication is before the second time, the PH may be calculated by using the changed path loss reference indicated by the path loss reference change indication; or if the receiving time of the path loss reference change indication is after the second time or the receiving time of the path loss reference change indication overlaps with the second time, the PH is calculated by using the changed path loss reference indicated by the path loss reference change indication, and the PH value in the PHR to the PH calculated by using the changed path loss reference. In this way, it can be ensured that the PH in the PHR reported by the terminal to the base station keeps consistent with the path loss reference used by the base station to calculate the PH, so as to improve reporting accuracy.

In another optional implementation, the specific path loss reference includes:

a path loss reference corresponding to a first time or a second time, where the first time is a time at which the terminal triggers PHR reporting (PHR trigger), and the second time is a time at which the terminal generates a PDU including a PHR or a specified time before a reporting moment of the power headroom report PHR.

The time at which the PDU including the PHR is generated may be a time at which a MAC PDU (PHR MAC PDU Assembly) including the PHR is generated.

The path loss reference corresponding to the first time may be a path loss reference determined according to the first time and having a specific relationship with the first time. For example, the path loss reference corresponding to the first time includes: a path loss reference used at the first time. When the path loss reference is not changed at the first time, the path loss reference used at the first time may include: a path loss reference used before the first time; and when the path loss reference is changed at the first time (for example, the path loss change reference indication is received at the first time), the path loss reference used at the first time may include: a currently changed path loss reference.

Because the path loss reference used at the first time is used for the PH calculation, it can be ensured that the PH in the PHR reported by the terminal to the base station keeps consistent with the path loss reference used by the base station to calculate the PH, so as to improve reporting accuracy.

Certainly, in some embodiments, the path loss reference having a specific relationship with the first time may also be a path loss reference used before the first time. In this case, it may not be considered whether the path loss reference change indication is received at the first time.

The path loss reference corresponding to the second time may be a path loss reference determined according to the second time and having a specific relationship with the second time. For example, the path loss reference corresponding to the second time includes: a path loss reference used at the second time or a latest used path loss reference before the second time.

The latest used path loss reference before the second time may be a path loss reference used by the terminal the last time before the second time. For example, when the path loss reference change indication is received at or after the second time, the path loss reference used by the terminal the last time before the second time is the path loss reference before receiving the path loss reference change indication.

Because the path loss reference used at the second time or the latest used path loss reference before the second time is used, it can be ensured that the PH in the PHR reported by the terminal to the base station keeps consistent with the path loss reference used by the base station to calculate the PH, so as to improve reporting accuracy.

In an optional implementation, if a receiving time of the path loss reference change indication is before the second time, the path loss reference corresponding to the second time includes: the changed path loss reference indicated by the path loss reference change indication; or if the receiving time of the path loss reference change indication is after the second time, the path loss reference corresponding to the second time includes: the path loss reference before receiving the path loss reference change indication; or if the receiving time of the path loss reference change indication overlaps with the second time, the path loss reference corresponding to the second time includes: the path loss reference before receiving the path loss reference change indication, or the changed path loss reference indicated by the path loss reference change indication.

In this implementation, if the receiving time of the path loss reference change indication is before the second time, the changed path loss reference indicated by the path loss reference change indication is used for the PH calculation, and it can be ensured that the PH in the PHR reported by the terminal to the base station keeps consistent with the path loss reference used by the base station to calculate the PH, so as to improve reporting accuracy.

In addition, if the receiving time of the path loss reference change indication is after the second time, the path loss reference before receiving the path loss reference change indication is used for the PH calculation. Because there is no need to use the changed path loss reference to calculate the PH again, this can improve efficiency of PHR reporting.

Moreover, when the receiving time overlaps with the second time, the path loss reference before receiving the path loss reference change indication or the changed path loss reference indicated by the path loss reference change indication may be used for the PH calculation, so as to improve flexibility of the PH calculation and adapt to requirements of different scenarios or services.

In an optional implementation, if a receiving time of the path loss reference change indication is before the first time, the path loss reference used at the first time includes: the changed path loss reference indicated by the path loss reference change indication; or if the receiving time of the path loss reference change indication is after the first time, the path loss reference used at the first time includes: the path loss reference before receiving the path loss reference change indication; or if the receiving time of the path loss reference change indication overlaps with the first time, the path loss reference used at the first time includes: the path loss reference before receiving the path loss reference change indication, or the changed path loss reference indicated by the path loss reference change indication.

In this implementation, if the receiving time of the path loss reference change indication is before the first time, the changed path loss reference indicated by the path loss reference change indication is used for the PH calculation, and it can be ensured that the PH in the PHR reported by the terminal to the base station keeps consistent with the path loss reference used by the base station to calculate the PH, so as to improve reporting accuracy.

In addition, if the receiving time of the path loss reference change indication is after the first time, the path loss reference before receiving the path loss reference change indication is used for the PH calculation. Because there is no need to use the changed path loss reference to calculate the PH again, this can improve efficiency of PHR reporting.

Moreover, when the receiving time overlaps with the first time, the path loss reference before receiving the path loss reference change indication or the changed path loss reference indicated by the path loss reference change indication may be used for the PH calculation, so as to improve flexibility of the PH calculation and adapt to requirements of different scenarios or services.

Certainly, in this embodiment, the following step may further be included:

Step 303: Report the PHR, where the PHR includes the PH calculated by using the specific path loss reference.

Certainly, the PHR may further include: a maximum transmission power for a cell. The reporting may be reporting the PHR to the base station, or is referred to as reporting the PHR to a network side.

In this embodiment, through the various optional implementations described above, the terminal can flexibly uses different path loss references to calculate the PH, so as to improve performance of the PH reporting by the terminal.

The plurality of optional implementations described above are described below in FIG. 4 by using an example.

Figure 4:
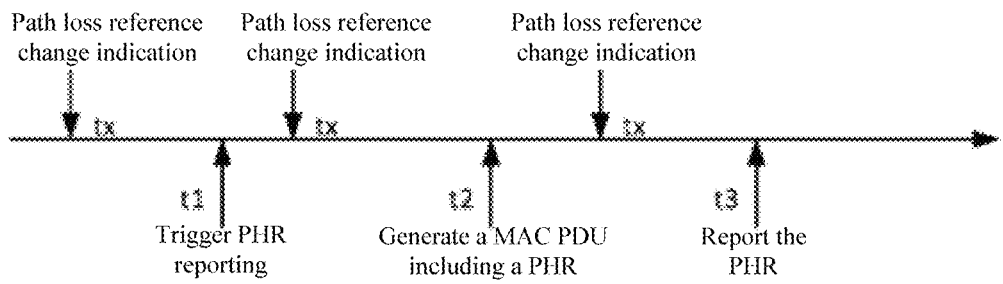
FIG. 4 is a schematic diagram of sending a path loss reference change indication according to an embodiment of this disclosure.

As shown in FIG. 4, in a first step, UE triggers PHR reporting (PHR trigger) at time t1 shown in FIG. 4. In a second step, the UE generates a MAC PDU including the PHR (PHR MAC PDU Assembly) at time t2 shown in FIG. 4, and in a third step, the UE reports the PHR (PHR Transmission) at time t3 shown in FIG. 4. Three receiving times tx of the path loss reference change indication (Change of path loss reference) in FIG. 4 may indicate that sending of the path loss reference change indication may have three cases: tx is before t1; tx is after t1 and before t2; and tx is after t2 and before t3. Certainly, in this embodiment of this disclosure, it is not precluded that the terminal receives a plurality of path loss reference change indications within the time range shown in FIG. 4.

In the case shown in FIG. 4, a path loss reference used for a PH value in the PHR reported by the UE includes any one of the following:

Method 1: Path loss reference used the last time (or referred to as a latest used path loss reference). For example, as shown in FIG. 4, if a network indicates at moment tx that a path loss reference for a PUSCH of the UE is changed from a "path loss reference 1" to a "path loss reference 2", the UE uses the "path loss reference 2" for calculation of a PH value of the PUSCH. For example: (1) if tx is before t2, the UE calculates a PH by using a new changed path loss reference indicated at moment tx; or (2) if tx is after or at t2, the UE calculates a PH (tx) by using a new changed path loss reference indicated at moment tx, and changes a PH (t2) value of a PHR included at moment t2 to the PH (tx) calculated by using the new changed path loss reference indicated at moment tx.

Method 2: Path loss reference used the last time at or before the time at which the PHR MAC PDU is generated (or the path loss reference may be referred to as: a path loss reference used at the second time, or a latest used path loss reference before the second time, where the second time is the time at which the PHR MAC PDU is generated or a specified time before a reporting moment of the power headroom report PHR). As shown in FIG. 4, a network indicates at moment tx that a path loss reference for a PUSCH of the UE is changed from a "path loss reference 1" to a "path loss reference 2": (1) If tx is before t2, the UE calculates a PH (tx) by using a new changed path loss reference indicated at moment tx; (2) if tx is after t2, the UE still uses a path loss reference before moment t2; or (3) if tx is the same as t2, the UE still uses the path loss reference before moment t2, or uses a changed path loss reference at moment tx (namely, t2).

Method 3: Path loss reference used when PHR reporting is triggered (or the path loss reference is referred to as a path loss reference used at the first time, where the first time is a time at which the PHR reporting is triggered). As shown in FIG. 4, a network indicates at moment tx that a path loss reference for a PUSCH of the UE is changed from a "path loss reference 1" to a "path loss reference 2": (1) If tx is before t1, the UE calculates a PH (tx) by using a new changed path loss reference indicated at moment tx; (2) if tx is after t1, the UE still uses a path loss reference before moment t1; or (3) if tx is the same as t1, the UE still uses the path loss reference before moment t1, or uses a path loss reference changed at moment tx (namely, t1).

According to the method provided in this embodiment of this disclosure, if the path loss reference of the UE is changed after the PHR is triggered and before the PHR is reported, the path loss reference used by the UE to calculate the PH value is specified, so that the network side and the UE side keep a consistent path loss reference used in the PH value calculation.

Figure 5:
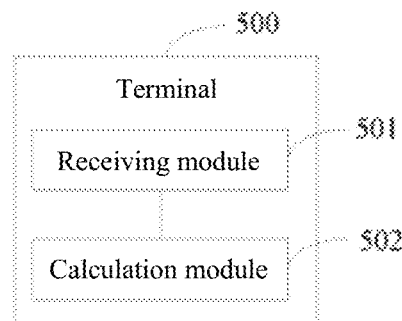
FIG. 5 is a structural diagram of a terminal according to an embodiment of this disclosure.

FIG. 5 is a structural diagram of a terminal according to an embodiment of this disclosure. As shown in FIG. 5, the terminal 500 includes:

a receiving module 501, configured to receive a path loss reference change indication; and a calculation module 502, configured to calculate a PH by using a specific path loss reference, where the specific path loss reference includes a path loss reference before receiving the path loss reference change indication, or a changed path loss reference indicated by the path loss reference change indication.

Optionally, the specific path loss reference includes:

a latest used path loss reference; or a path loss reference corresponding to a first time or a second time, where the first time is a time at which the terminal triggers PHR reporting, and the second time is a time at which the terminal generates a protocol data unit PDU including a power headroom report PHR or a specified time before a reporting moment of the power headroom report PHR.

Optionally, the path loss reference corresponding to the first time includes:

a path loss reference used at the first time; and/or the path loss reference corresponding to the second time includes:

a path loss reference used at the second time, or a latest used path loss reference before the second time.

Optionally, if a receiving time of the path loss reference change indication is before the second time, the latest used path loss reference includes: the changed path loss reference indicated by the path loss reference change indication; or if the receiving time of the path loss reference change indication is after the second time, or the receiving time of the path loss reference change indication overlaps with the second time, the latest used path loss reference includes: the changed path loss reference indicated by the path loss reference change indication, wherein the terminal changes a PH value in the PHR to a PH calculated by using the changed path loss reference.

Optionally, if a receiving time of the path loss reference change indication is before the second time, the path loss reference corresponding to the second time includes: the changed path loss reference indicated by the path loss reference change indication; or if the receiving time of the path loss reference change indication is after the second time, the path loss reference corresponding to the second time includes: the path loss reference before receiving the path loss reference change indication; or if the receiving time of the path loss reference change indication overlaps with the second time, the path loss reference corresponding to the second time includes: the path loss reference before receiving the path loss reference change indication, or the changed path loss reference indicated by the path loss reference change indication.

Optionally, if a receiving time of the path loss reference change indication is before the first time, the path loss reference used at the first time includes: the changed path loss reference indicated by the path loss reference change indication; or if the receiving time of the path loss reference change indication is after the first time, the path loss reference used at the first time includes: the path loss reference before receiving the path loss reference change indication; or if the receiving time of the path loss reference change indication overlaps with the first time, the path loss reference used at the first time includes: the path loss reference before receiving the path loss reference change indication, or the changed path loss reference indicated by the path loss reference change indication.

The terminal device provided in the embodiments of this disclosure can implement the processes implemented by the terminal in the method embodiments of FIG. 2 and FIG. 4, so as to improve performance of PH reporting by the terminal. To avoid repetition, details are not described herein again.

Figure 6:
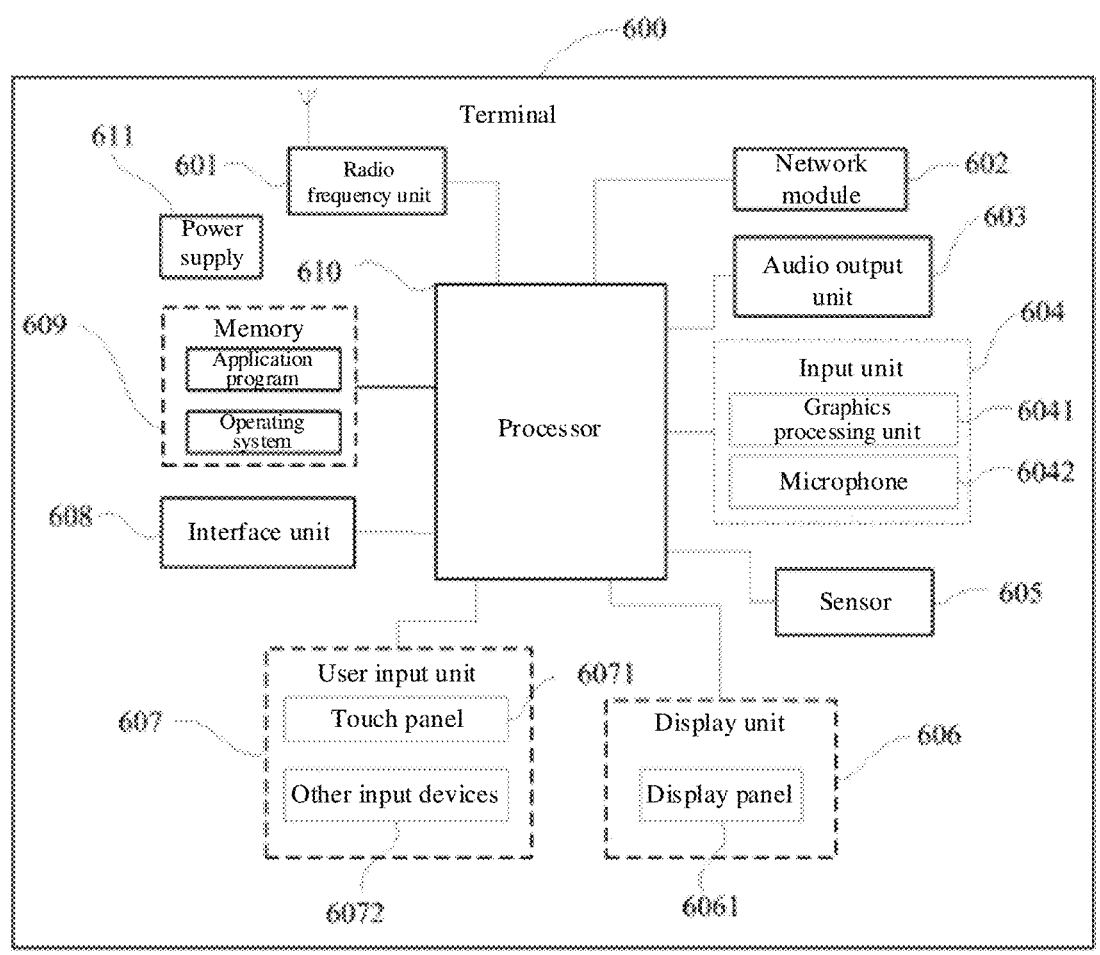
FIG. 6 is a structural diagram of another terminal according to an embodiment of this disclosure.

FIG. 6 is a schematic diagram of a hardware structure of a terminal according to an embodiment of this disclosure.

The terminal 600 includes, but is not limited to: a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute a limitation to the terminal. The terminal may include more or fewer components than those shown in the figure, or some components may be combined, or there may be a different component arrangement. In this embodiment of this disclosure, the terminal includes but is not limited to a mobile phone, a tablet computer, a notebook computer, a palmtop computer, a vehicle-mounted terminal, a wearable device, a pedometer, or the like.

The radio frequency unit 601 is configured to receive a path loss reference change indication.

The processor 610 is configured to calculate a PH by using a specific path loss reference, where the specific path loss reference includes a path loss reference before receiving the path loss reference change indication, or a changed path loss reference indicated by the path loss reference change indication.

Optionally, the specific path loss reference includes:

a latest used path loss reference; or a path loss reference corresponding to a first time or a second time, where the first time is a time at which the terminal triggers PHR reporting, and the second time is a time at which the terminal generates a protocol data unit PDU including a power headroom report PHR or a specified time before a reporting moment of the power headroom report PHR.

Optionally, the path loss reference corresponding to the first time includes:

a path loss reference used at the first time; and/or the path loss reference corresponding to the second time includes:

a path loss reference used at the second time, or a latest used path loss reference before the second time.

Optionally, if a receiving time of the path loss reference change indication is before the second time, the latest used path loss reference includes: the changed path loss reference indicated by the path loss reference change indication; or if the receiving time of the path loss reference change indication is after the second time, or the receiving time of the path loss reference change indication overlaps with the second time, the latest used path loss reference includes: the changed path loss reference indicated by the path loss reference change indication, wherein the terminal changes a PH value in the PHR to a PH calculated by using the changed path loss reference.

Optionally, if a receiving time of the path loss reference change indication is before the second time, the path loss reference corresponding to the second time includes: the changed path loss reference indicated by the path loss reference change indication; or if the receiving time of the path loss reference change indication is after the second time, the path loss reference corresponding to the second time includes: the path loss reference before receiving the path loss reference change indication; or if the receiving time of the path loss reference change indication overlaps with the second time, the path loss reference corresponding to the second time includes: the path loss reference before receiving the path loss reference change indication, or the changed path loss reference indicated by the path loss reference change indication.

Optionally, if a receiving time of the path loss reference change indication is before the first time, the path loss reference used at the first time includes: the changed path loss reference indicated by the path loss reference change indication; or if the receiving time of the path loss reference change indication is after the first time, the path loss reference used at the first time includes: the path loss reference before receiving the path loss reference change indication; or if the receiving time of the path loss reference change indication overlaps with the first time, the path loss reference used at the first time includes: the path loss reference before receiving the path loss reference change indication, or the changed path loss reference indicated by the path loss reference change indication.

The foregoing terminal can improve performance of PH reporting by the terminal.

It should be understood that, in this embodiment of this disclosure, the radio frequency unit 601 may be configured to transmit and receive information, or transmit or receive signals during communication. Specifically, after receiving downlink data from a base station, the radio frequency unit sends the downlink data to the processor 610 for processing. In addition, the radio frequency unit sends the uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The terminal provides a user with wireless broadband Internet access through the network module 602, for example, helps the user send and receive emails, browse web pages, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a receiver, and the like.

The input unit 604 is configured to receive audio or video signals. The input unit 604 may include a graphics processing unit (Graphics Processing Unit, GPU) 6041 and a microphone 6042. The graphics processing unit 6041 processes image data of a static image or video obtained by an image capture apparatus (such as, a camera) in a video capture mode or an image capture mode. A processed image frame can be displayed on the display unit 606. The image frames processed by the GPU 6041 can be stored in the memory 609 (or another storage medium) or sent by the radio frequency unit 601 or the network module 602. The microphone 6042 can receive sound and can process such sound into audio data. The processed audio data may be converted in a telephone call mode into a format that can be sent by the radio frequency unit 601 to a mobile communications base station for output.

The terminal 600 further includes at least one sensor 605, such as a light sensor, a motion sensor, and other sensors. Specifically, the light sensor includes an ambient light sensor and a proximity sensor, where the ambient light sensor can adjust brightness of the display panel 6061 based on brightness of ambient light, and the proximity sensor can turn off the display panel 6061 and/or backlight when the terminal 600 moves towards the ear. As a motion sensor, an accelerometer sensor can detect magnitude of acceleration in various directions (usually three axes), can detect magnitude and the direction of gravity when stationary, can be configured to identify terminal postures (such as horizontal and vertical screen switch, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by a user or information provided for the user. The display unit 606 may include a display panel 6061. The display panel 6061 may be configured in a form of a liquid crystal display (Liquid Crystal Display, LCD), an organic light-emitting diode (Organic Light-Emitting Diode, OLED), or the like.

The user input unit 607 can be configured to receive input numeric or character information, and generate key signal inputs related to user settings and function control of the terminal. Specifically, the user input unit 607 includes a touch panel 6071 and other input devices 6072. The touch panel 6071 is also referred to as a touchscreen, and may collect a touch operation of the user on or near the touch panel 6071 (for example, an operation performed on or near the touch panel 6071 by the user by using any appropriate object or accessory such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 610, and receives and executes a command sent by the processor 610. In addition, the touch panel 6071 can be implemented in various types such as resistive, capacitive, infrared, and surface acoustic wave. In addition to the touch panel 6071, the user input unit 607 may further include the other input devices 6072. Specifically, the other input devices 6072 may include but are not limited to a physical keyboard, function keys (such as a volume control key and an on/off key), a trackball, a mouse, and a joystick. Details are not described herein.

Further, the touch panel 6071 can be superposed on the display panel 6061. When the touch panel 6071 detects touch operations thereon or nearby, the touch panel 6071 transmits the touch operations to the processor 610 to determine the type of a touch event. Subsequently, the processor 610 provides corresponding visual output on the display panel 6061 according to the type of the touch event. In FIG. 6, the touch panel 6071 and the display panel 6061 are used as two independent components to implement input and output functions of the terminal. However, in some embodiments, the touch panel 6071 and the display panel 6061 may be integrated to implement the input and output functions of the terminal. This is not specifically limited herein.

The interface unit 608 is an interface connecting an external apparatus to the terminal 600. For example, the external apparatus may include a wired or wireless headphone port, an external power supply (or a battery charger) port, a wired or wireless data port, a storage card port, a port used to connect to an apparatus having an identification module, an audio input/output (I/O) port, a video I/O port, an earphone port, and the like. The interface unit 608 may be configured to receive an input (for example, data information or power) from an external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may be integrated with an application processor and a modem processor. The application processor mainly processes the operating system, the user interface, applications, and the like. The modem processor mainly processes wireless communication. It may be understood that the foregoing modem processor may not be integrated into the processor 610.

The terminal 600 may also include a power supply 611 (for example, a battery) that supplies power to various components. Optionally, the power supply 611 may be logically connected to the processor 610 through a power supply management system, to perform functions of managing charging, discharging, and power consumption through the power supply management system.

In addition, the terminal 600 includes some functional modules not shown. Details are not described herein again.

Optionally, an embodiment of this disclosure further provides a terminal, including a processor 610, a memory 609, and a computer program stored in the memory 609 and capable of running on the processor 610, where when the computer program is executed by the processor 610, the processes in the embodiments of the method for PH calculation are implemented, and the same technical effect can be achieved. To avoid repetition, details are not described herein again.

An embodiment of this disclosure further provides a computer-readable storage medium. The computer-readable storage medium stores a computer program, and when the computer program is executed by a processor, the processes in the embodiments of the method for PH calculation provided in the embodiments of this disclosure are implemented, and the same technical effect can be achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. In the absence of more limitations, an element defined by "including a . . . " does not preclude the existence of other identical elements in the process, method, article, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a readable storage medium (such as a ROM/RAM, a magnetic disk, or a compact disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

What is claimed is:

1. A method for power headroom PH calculation, applied to a terminal, wherein the method comprises:
   receiving a path loss reference change indication, wherein the path loss reference change indication is used to indicate changing a first path loss reference to a second path loss reference; and calculating a PH by using a specific path loss reference;
wherein the specific path loss reference comprises: a path loss reference corresponding to a second time, the second time is a time at which the terminal generates a protocol data unit PDU comprising a power headroom report PHR or a specified time before a reporting moment of the power headroom report PHR, and the specified time is after the time at which the terminal generates the PDU comprising the PHR; wherein:
if a receiving time of the path loss reference change indication is before the second time, the path loss reference corresponding to the second time comprises: the changed path loss reference indicated by the path loss reference change indication; or,
if the receiving time of the path loss reference change indication is after the second time, the path loss reference corresponding to the second time comprises: the path loss reference before receiving the path loss reference change indication; or,
if the receiving time of the path loss reference change indication overlaps with the second time, the path loss reference corresponding to the second time comprises: the path loss reference before receiving the path loss reference change indication, or the changed path loss reference indicated by the path loss reference change indication.

2. The method according to claim 1, wherein
the path loss reference corresponding to the second time comprises:
a path loss reference used at the second time, or a latest used path loss reference before the second time.

3. The method according to claim 2,
wherein the receiving time of the path loss reference change indication is after the second time or the receiving time of the path loss reference change indication overlaps with the second time, the path loss reference corresponding to the second time comprises: the changed path loss reference indicated by the path loss reference change indication, and the terminal changes a PH value in the PHR to a PH calculated by using the changed path loss reference.

4. A terminal, comprising a memory, a processor, and a program stored in the memory and capable of running on the processor, wherein when the program is executed by the processor, the following steps are implemented:
receiving a path loss reference change indication, wherein the path loss reference change indication is used to indicate changing a first path loss reference to a second path loss reference; and
calculating a PH by using a specific path loss reference;
wherein the specific path loss reference comprises: a path loss reference corresponding to a second time, the second time is a time at which the terminal generates a protocol data unit PDU comprising a power headroom report PHR or a specified time before a reporting moment of the power headroom report PHR, and the specified time is after the time at which the terminal generates the PDU comprising the PHR; wherein:
if a receiving time of the path loss reference change indication is before the second time, the path loss reference corresponding to the second time comprises: the changed path loss reference indicated by the path loss reference change indication; or,
if the receiving time of the path loss reference change indication is after the second time, the path loss reference corresponding to the second time comprises: the path loss reference before receiving the path loss reference change indication; or,
if the receiving time of the path loss reference change indication overlaps with the second time, the path loss reference corresponding to the second time comprises: the path loss reference before receiving the path loss reference change indication, or the changed path loss reference indicated by the path loss reference change indication.

5. The terminal according to claim 4, wherein
the path loss reference corresponding to the second time comprises:
a path loss reference used at the second time, or a latest used path loss reference before the second time.

6. The terminal according to claim 5,
wherein the receiving time of the path loss reference change indication is after the second time or the receiving time of the path loss reference change indication overlaps with the second time, the path loss reference corresponding to the second time comprises: the changed path loss reference indicated by the path loss reference change indication, and the terminal changes a PH value in the PHR to a PH calculated by using the changed path loss reference.

7. A non-transitory computer-readable storage medium, wherein the non-transitory computer-readable storage medium stores a program, and when the program is executed by a processor, the following steps are implemented:
receiving a path loss reference change indication, wherein the path loss reference change indication is used to indicate changing a first path loss reference to a second path loss reference; and
calculating a PH by using a specific path loss reference;
wherein the specific path loss reference comprises: a path loss reference corresponding to a second time, the second time is a time at which the terminal generates a protocol data unit PDU comprising a power headroom report PHR or a specified time before a reporting moment of the power headroom report PHR, and the specified time is after the time at which the terminal generates the PDU comprising the PHR; wherein:
if a receiving time of the path loss reference change indication is before the second time, the path loss reference corresponding to the second time comprises: the changed path loss reference indicated by the path loss reference change indication; or,
if the receiving time of the path loss reference change indication is after the second time, the path loss reference corresponding to the second time comprises: the path loss reference before receiving the path loss reference change indication; or,
if the receiving time of the path loss reference change indication overlaps with the second time, the path loss reference corresponding to the second time comprises: the path loss reference before receiving the path loss reference change indication, or the changed path loss reference indicated by the path loss reference change indication.

8. The non-transitory computer-readable storage medium according to claim 7, wherein
the path loss reference corresponding to the second time comprises:
a path loss reference used at the second time, or a latest used path loss reference before the second time.

9. The non-transitory computer-readable storage medium according to claim 8, wherein the receiving time of the path loss reference change indication is after the second time or the receiving time of the path loss reference change indication overlaps with the second time, the path loss reference corresponding to the second time comprises: the changed path loss reference indicated by the path loss reference change indication, and the terminal changes a PH value in the PHR to a PH calculated by using the changed path loss reference.

\* \* \* \* \*